United States Patent [19]

Nagase

[11] Patent Number: 5,237,474
[45] Date of Patent: Aug. 17, 1993

[54] HEAD CARTRIDGE APPARATUS HAVING HEAD SUPPORTING ARM PARTIALLY INSERTED INTO DISK CASE THROUGH WINDOW FORMED THEREIN

[75] Inventor: Fumio Nagase, Tokyo, Japan

[73] Assignee: Teac Corporation, Tokyo, Japan

[21] Appl. No.: 742,643

[22] Filed: Aug. 7, 1991

[30] Foreign Application Priority Data

Aug. 10, 1990 [JP] Japan .................................. 2-213524

[51] Int. Cl.⁵ .............................................. G11B 5/48
[52] U.S. Cl. .................................................... 360/104
[58] Field of Search ........................................ 360/104

[56] References Cited

U.S. PATENT DOCUMENTS 4,740,854  4/1988  Shibuya et al. .

4,811,143  3/1989  Ohashi ........................... 360/104 X

FOREIGN PATENT DOCUMENTS 60-223063  11/1985  Japan ................................. 360/104

*Primary Examiner*—A. J. Heinz
*Attorney, Agent, or Firm*—Michael N. Meller

[57] ABSTRACT

A head carriage apparatus includes a carriage main body, a first magnetic head inserted into a disk case via a window formed therein and coming into contact with a recording medium in a recording/reproducing state where data is recorded on or reproduced from the recording medium, and an arm supporting the first magnetic head and being fixed to the carriage main body so that the arm moves flexibly and is partially inserted, together with the first magnetic head, into the disk case via the window.

8 Claims, 3 Drawing Sheets

FIG. I PRIOR ART
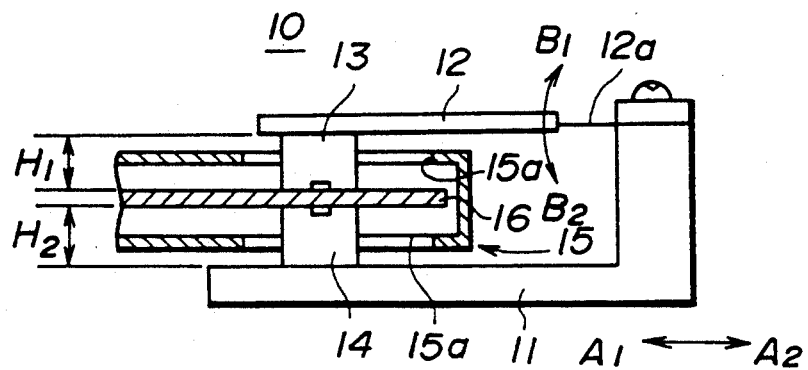
FIG. 2 PRIOR ART
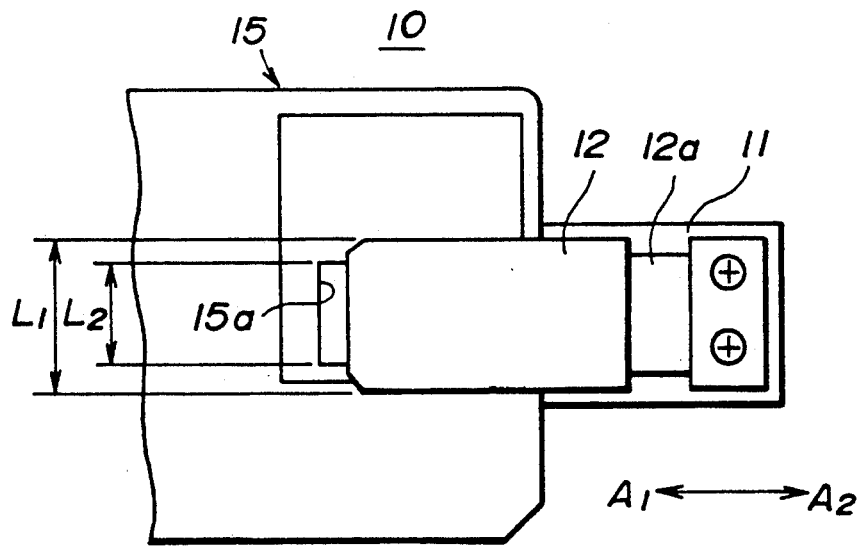

HEAD CARTRIDGE APPARATUS HAVING HEAD SUPPORTING ARM PARTIALLY INSERTED INTO DISK CASE THROUGH WINDOW FORMED THEREIN

BACKGROUND OF THE INVENTION

The present invention generally relates to a head carriage apparatus, and more particularly to a head carriage apparatus suitable for a thin disk drive apparatus.

A disk drive apparatus for driving a magnetic flexible disk serving as a data storage medium has a head carriage apparatus, which moves a magnetic head in the radial directions of the disk.

FIG. 1 shows a conventional head carriage apparatus 10 of a two-sided type, which is installed in a disk apparatus for driving a 3.5-inch flexible disk. The head carriage apparatus 10 is generally composed of a carriage main body 11 and an arm 12, and is driven in the directions indicated by arrows A1 and A2 by a driving mechanism, which is composed of, for example, a belt and a screw (not shown for the sake of simplicity).

The carriage main body 11 is connected to the arm 12 by a leaf spring 12a. The flexibility of the leaf spring 12a varies the arm 12 in the directions indicated by arrows B1 and B2. Further, magnetic head 13 is attached to the arm 12, and the magnetic head 14 is slidably mounted to the carriage main body 11.

Meanwhile, a 3.5-inch flexible disk 16 is housed in a disk case 15, as shown in FIG. 2. The magnetic heads 13 and 14 are inserted into the disk case 15 via a head window 15a formed in the disk case 15, and comes into contact with the flexible disk 16.

Conventionally, as shown in FIG. 2, the width L1 of the arm 12 of the head carriage apparatus 10 is set larger than the width L2 of the head window 15a, so that only the magnetic heads 13 and 14 are inserted into the disk case 15. Recently, it has been required to provide a thin and compact disk drive apparatus suitable for a thin and compact computer or the like.

However, the conventional head carriage apparatus 10 shown in FIGS. 1 and 2 has a disadvantage in that the arm 12 cannot be inserted into the head window 15a because the width L1 of the arm 12 is set larger than the width L2 of the head window 15a. Thus, it is necessary to design the magnetic heads 13 and 14 so that they have larger heights H1 and H2 which make it possible for the magnetic heads 13 and 14 to come into contact with the flexible disk 13 and slide thereon. For example, when the disk case 15 is 3.3±0.2 mm thick, the sum of the heights H1 and H2 (slider heights) is approximately equal to 3.5 mm. When a clearance regarding the disk case 15, the carriage main body 11 and the arm 12 is taken into account, the sum of the heights H1 and H2 is generally set to a value between 2.5 mm-2.7 mm.

The arm 12 is moved in the direction B1 shown in FIG. 1 by means of a mechanism (not shown for the sake of convenience) while the disk case 15 is loaded and ejected so that the magnetic heads 13 and 14 are prevented from coming into contact with the head window 15a. Thus, as the slider height increases, it becomes necessary to greatly move the arm 12 in the upward direction B1 in order to move the magnetic heads 13 and 14 away from the disk case 15. For this requirement, it is necessary to provide a large space necessary to move the arm 12 in the disk apparatus. Thus, it is difficult to provide a thin, compact disk drive apparatus.

SUMMARY OF THE INVENTION

It is a general object of the present invention to provide a novel and useful head carriage apparatus in which the above-mentioned disadvantages are eliminated.

A more specific object of the present invention is to provide a thin and compact head carriage apparatus.

The above-mentioned objects of the present invention are achieved by a head carriage apparatus includes a carriage main body, a first magnetic head inserted into a disk case via a window formed therein and coming into contact with a recording medium in a recording-/reproducing state where data is recorded on or reproduced from the recording medium, and an arm supporting the first magnetic head and being fixed to the carriage main body so that the arm moves flexibly and is partially inserted, together with the first magnetic head, into the disk case via the window.

Other objects, features and advantages of the present invention will become more apparent from the following detailed description when read in conjunction with the accompanying drawings in which:

BRIEF DESCRIPTION OF THE DRAWINGS

FIG. 1 is a side view of a conventional disk carriage apparatus;

FIG. 2 is a plan view of the conventional disk carriage apparatus shown in FIG. 1;

DESCRIPTION OF THE PREFERRED EMBODIMENTS

Figure 3:
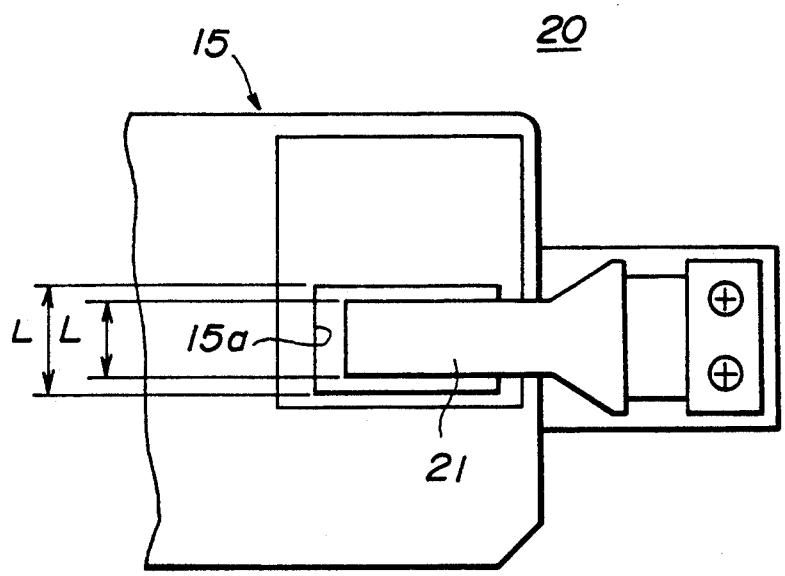
FIG. 3 is a side view of a head carriage device according to a preferred embodiment of the present invention.
Figure 4:
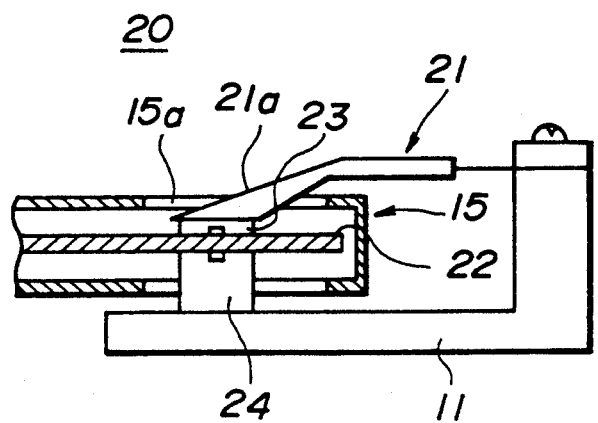
FIG. 4 is a side view of the head carriage device shown in FIG. 3.
Figure 5:
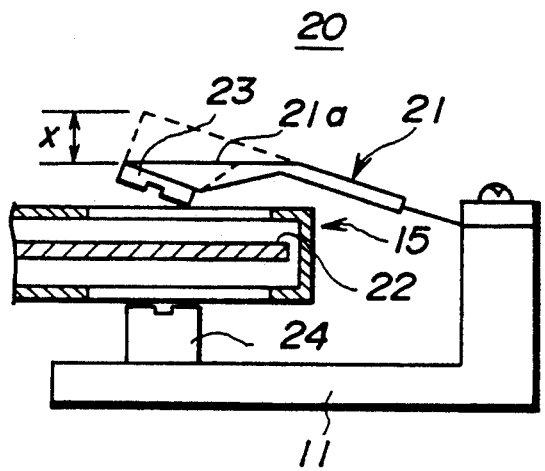
FIG. 5 is a side view of of the head carriage device shown in FIG. 3 in which an arm has been lifted.

A description will now be given of a preferred embodiment of the present invention with reference to FIGS. 3, 4 and 5. A head carriage apparatus 20 according to the preferred embodiment of the present invention is provided in a disk apparatus, such as a magnetic disk device, and moves therein so that magnetic heads are located at desired positions on both sides of a recording medium of a flexible disk. In FIGS. 3, 4 and 5, those parts which are the same as those are given the same reference numerals.

The head carriage apparatus 20 has an essential feature that the width L1 of an arm 21 is made smaller than the width L2 of the window 15a, that is, L1<L2. With this arrangement, it becomes possible to insert the arm 21 into the inner portion of the disk case 15.

As shown in FIG. 4, the arm 21 is inserted into the inner portion of the disk case via the window 15a formed in the disk case 15, so that the arm 21 can come close to the flexible disk 22. During this operation, by adjusting an amount of insertion of the arm 21 into the disk case 15, it is possible to arbitrarily adjust the height of the magnetic head 23. As a result, it becomes possible to reduce the height of the magnetic head 23 and the thickness of the head carriage apparatus 20.

As is well known, the disk case 15 is detachably loaded in the disk apparatus (not shown), and information is recorded on or reproduced from the flexible disk 22 when the disk case 15 has been loaded in the disk apparatus. While the disk case 15 is being loaded or unloaded, a conventional arm lift mechanism (not shown for the sake of simplicity) moves upwardly in order to prevent the magnetic heads 23 and 24 from coming into contact with the disk case 15. Such an arm lift mechanism is disclosed in U.S. Pat. No. 4,972,282, the disclosure of which is incorporated by reference. During the arm lifting operation, the smaller the upward movement of the arm 21, the smaller the space in the head carriage apparatus 20 necessary to upwardly move the arm 12.

FIG. 5 shows the state where the arm 21 is in a lifted state. The arm 21 of the head carriage apparatus 20 is inserted into the disk case 15, so that a reduced amount of lifting the arm 21 is needed to move the magnetic head 23 away from the disk case 15. It has been confirmed that the head carriage apparatus 20 is approximately 2 mm thinner than the conventional apparatus 10 for the aforementioned dimensions of the disk case 15.

A taper portion 21a is formed at an end portion of the arm 21 having an upper surface which is substantially horizontally positioned when the arm 21 is maintained in a lifted state, as shown in FIG. 5. An inner surface of the arm 21 has an inclined portion spaced apart from the window 15a. It should be noted that the conventional arm 21 does not any taper portion. The taper portion 21a contributes to a reduction in the thickness (height) of the disk carriage apparatus 20, as shown by X shown in FIG. 5. It should be noted that the thickness of the magnetic head 23 is made much smaller than that of the magnetic head 13. This can be done by use of the taper portion 21a. That is, since the arm 21 is inwardly bent, the magnetic head 21a can be made thinner.

It should be noted that it is not possible to reduce the thickness of the magnetic head 24 in the same way as the magnetic head 23 because the disk case 15 is loaded and moved downward, as shown in FIG. 4.

Figure 6:
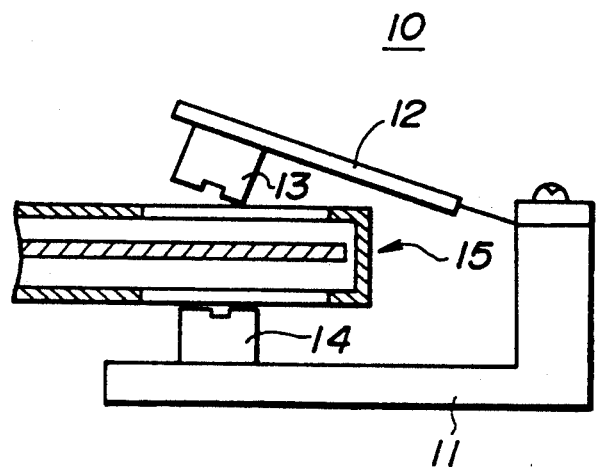
FIG. 6 is a side view of the conventional head carriage device shown in FIG. 1 in which an arm is maintained in an arm lifted state.

FIG. 6 shows a state where the arm 12 of the aforementioned conventional disk carriage apparatus 10 is maintained in a lifted state. It can be seen from FIGS. 5 and 6 that the head carriage apparatus 20 is thinner than the head carriage apparatus 10.

The present invention is not limited to the specifically disclosed embodiment in which the only the arm 21 is inserted into the disk case 15. For example, it is possible to support the magnetic head 24 by a mechanism which is the same as that for the magnetic head 23. In this case, the thickness of the disk carriage apparatus 20 can be further reduced.

It should be noted that the term "thin" is based on the height of the head carriage apparatus 20 when the arm 21 is maintained in a lifted state. Thus, the height of the head carriage apparatus 20 obtained during recording or reproducing is almost the same as that of the head carriage apparatus 10.

The present invention is not limited to the specifically disclosed embodiments, and variations and modifications may be made without departing from the scope of the present invention.

What is claimed is:

1. A head carriage apparatus comprising:
   a carriage main body;
   a first magnetic head inserted into a disk case via a window formed therein and coming into contact with a recording medium in a recording/reproducing state where data is recorded on or reproduced from said recording medium;
   an arm supporting said first magnetic head and being fixed to said carriage main body so that said arm moves flexibly and is partially inserted, together with said first magnetic head, into said disk case via said window;
   a second magnetic head slidably mounted on said carriage main body and opposite to said first magnetic head;
   said first magnetic head has a first thickness which is the distance between two opposing surfaces thereof parallel to the recording medium;
   said second magnetic head has a second thickness which is the distance between two opposing surfaces thereof parallel to the recording medium; and
   said first thickness is smaller than said second thickness 2. A head carriage apparatus as claimed in claim 1, wherein said arm has a portion which is inserted into said the disk case and which has a width smaller than that of said window formed in the disk case.

3. A head carriage apparatus as claimed in claim 1, wherein: said arm has a first surface opposite to a second surface on which said head is mounted; and said first surface is substantially parallel to said recording medium when said arm is moved away from said recording medium and out of said case.

4. A head carriage apparatus as claimed in claim 3, wherein said second surface of said arm is oblique with respect to the recording disk in the state when said arm is moved away from said recording medium and out of said case.

5. A head carriage apparatus as claimed in claim 1, wherein said arm has an inclined inner surface spaced apart from said window in said recording/reproducing state.

6. A head carriage apparatus as claimed in claim 1, wherein said arm comprises a leaf spring.

7. A disk carriage apparatus as claimed in claim 6, wherein said leaf spring has a first end portion on which said first magnetic head is mounted, and a second end portion fixed to said carriage main body.

8. A disk carriage apparatus as claimed in claim 1, wherein said recording medium comprises a flexible disk.

* * * * *